United States Patent
Niedermeier et al.

(10) Patent No.: US 9,702,408 B2
(45) Date of Patent: Jul. 11, 2017

(54) ROLLING-BEARING CAGE

(75) Inventors: Herbert Niedermeier, Poppenhausen (DE); Dieter Lehmann, Coswig (DE)

(73) Assignee: GEBRÜDER REINFURT GmbH & CO. KG, Wurzburg (DE)

( * ) Notice: Subject to any disclaimer, the term of this patent is extended or adjusted under 35 U.S.C. 154(b) by 1661 days.

(21) Appl. No.: 12/306,398

(22) PCT Filed: Jul. 3, 2007

(86) PCT No.: PCT/EP2007/005886
§ 371 (c)(1),
(2), (4) Date: Aug. 18, 2009

(87) PCT Pub. No.: WO2008/003466
PCT Pub. Date: Jan. 10, 2008

(65) Prior Publication Data
US 2010/0021098 A1 Jan. 28, 2010

(30) Foreign Application Priority Data
Jul. 4, 2006 (DE) .................. 10 2006 030 836

(51) Int. Cl.
*F16C 33/44* (2006.01)
*F16C 33/41* (2006.01)

(52) U.S. Cl.
CPC ............ *F16C 33/44* (2013.01); *F16C 33/416* (2013.01); *F16C 2300/12* (2013.01); *F16C 2316/13* (2013.01); *F16C 2322/39* (2013.01)

(58) Field of Classification Search
USPC .................................................. 384/527, 576
See application file for complete search history.

(56) References Cited

U.S. PATENT DOCUMENTS

| | | | |
|---|---|---|---|
| 5,180,231 A * | 1/1993 | Ueno et al. ............ | 384/527 |
| 5,271,679 A * | 12/1993 | Yamazumi et al. ......... | 384/527 |
| 5,522,667 A * | 6/1996 | Miyake .................. | 384/492 |
| 5,860,747 A * | 1/1999 | Wan et al. ............. | 384/463 |
| 5,939,363 A | 8/1999 | Toyota et al. | |
| 5,941,704 A | 8/1999 | Arai et al. | |
| 5,988,891 A * | 11/1999 | Yamamoto et al. ......... | 384/463 |
| 6,102,576 A | 8/2000 | Toyota et al. | |
| 6,113,278 A | 9/2000 | Ohira | |
| 6,164,831 A | 12/2000 | Matsui et al. | |
| 6,682,224 B2 * | 1/2004 | Ooitsu et al. ............ | 384/527 |
| 6,770,378 B1 | 8/2004 | Lehmann | |
| 6,808,310 B2 * | 10/2004 | Ooitsu et al. ............ | 384/527 |
| 6,828,041 B2 * | 12/2004 | Ueda et al. ............... | 428/660 |
| 7,771,125 B2 * | 8/2010 | Hirata et al. ............ | 384/527 |
| 2002/0141674 A1 | 10/2002 | Ooitsu et al. | |
| 2003/0063825 A1 | 4/2003 | Ooitsu et al. | |
| 2007/0244212 A1 | 10/2007 | Lehmann | |
| 2009/0105436 A1 | 4/2009 | Lehmann et al. | |

FOREIGN PATENT DOCUMENTS

| | | |
|---|---|---|
| EP | 0 896 164 | 2/1999 |
| EP | 1 217 235 | 12/2001 |

* cited by examiner

*Primary Examiner* — Michael P Ferguson
(74) *Attorney, Agent, or Firm* — McDonnell Boehnen Hulbert & Berghoff LLP

(57) ABSTRACT

The present invention relates to a cage for a rolling bearing, in particular for a ball bearing, to a rolling bearing with a cage and to the use of a cage in a high-speed rolling bearing with a characteristic speed value n×dm>1,000,000 mm/min, in particular for industrial spindle-bearing applications and in the medical sector, in particular in dental technology.

7 Claims, 1 Drawing Sheet

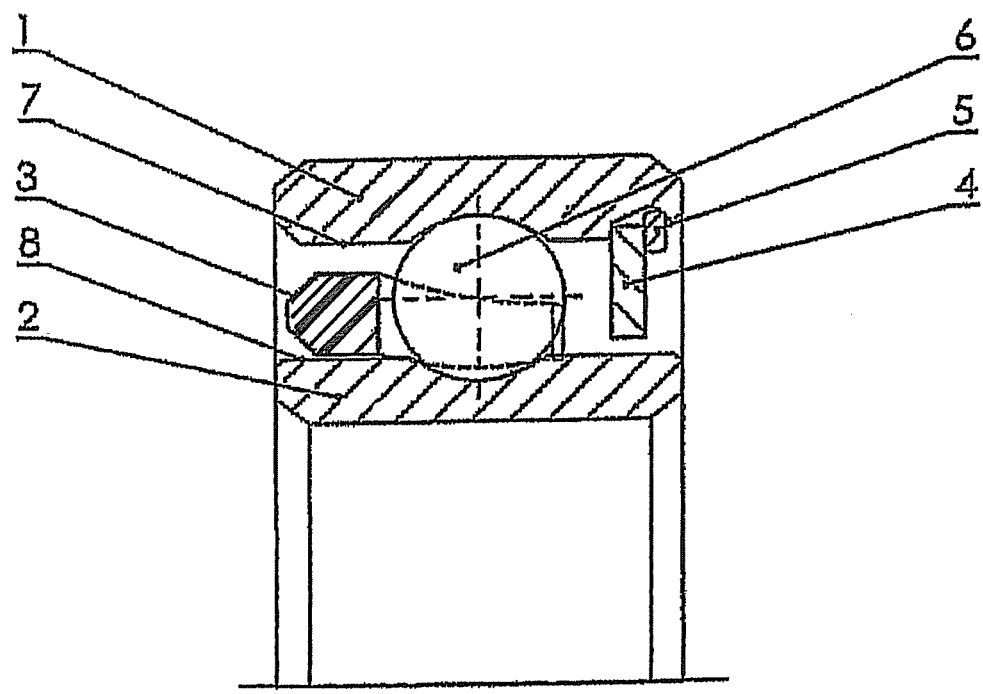

ROLLING-BEARING CAGE

BACKGROUND OF THE INVENTION (1) Field of the Invention

The present invention relates to a cage for a rolling bearing, in particular for a ball bearing, a rolling bearing with a cage, and the use of a cage in a high speed rolling bearing with a characteristic speed value n×dm>1,000,000 mm/min, whereby n corresponds to the inner ring speed and dm to the mean bearing diameter, whereby the mean bearing diameter dm is calculated from half the sum of the outside diameter and the bore diameter, in particular for industrial spindle-bearing applications and in the medical sector, especially in dental technology.

(2) Description of the Art

In the state of the art composite materials are described such as, e.g., fabric-reinforced phenolic resin that have a sufficient performance with respect to friction and wear to achieve very good lifespan values in high-speed ball bearing applications. The favorable properties of this material can be improved if in addition oil is incorporated in the cotton fabric, which in addition increases the lifespan in applications in which there is a lack of lubrication. One of the main problems in cages made of composite materials, for example, a fabric-reinforced phenolic resin with a fine weave cotton fabric, is that these materials are usually thermally stable only up to about 120° C. and steam pressure sterilization at, for example, 136° C. is therefore not possible. However, this presents a big problem in particular for applications in the medical sector.

Other plastics that are used as cage material in high-speed, medical technical applications are high-performance plastics such as polyetheretherketone (PEEK), polyetherketon (PEK), polyamide imide (PAI), and polyimide (PI), which in lubricated grade form can meet, by admixture of lubrication additives and fibers, the requirements in medical technology. However, these are only functional in as far as favorable tribological conditions can be guaranteed in the ball bearing.

However, very often a lack of lubrication prevails, especially in applications in the dental sector. The ball bearing that is used for this can often not be provided with grinding covers (stationary seal rings) since these attain high friction values during operation and the temperature in the ball bearing increases significantly as a result. However, in particular in the dental turbine handpiece, a temperature increase is not acceptable as a device temperature>38° C. is experienced as very unpleasant by dental technicians and dentists. These ball bearings can therefore not be sealed but only covered. such a cover disk, however, has the disadvantage that a definite gap exists between the cover disk and the inner ring through which the lubricant can escape to the outside (see FIG. 1). In the medical sector, in particular in dental turbine bearings, the effect of the lubricant leakage is amplified by the fact that the supply air of the turbine cannot only escape to the outside through the ventilation opening but also through the turbine bearing. This leads to a transport of the lubricant (lubricant grease or oil) to the outside and thereby to the above-described situation with a lack of lubrication.

For example, in DE 198 48 051 A1 and in U.S. Pat. No. 6,113,278 a high-performance thermoplastic (PI and PAI, respectively) produced by means of a sintering technique is described that is equipped with a defined free pore volume. A suitable lubricating oil is incorporated by vacuum impregnation in the free pore space. This lubricating oil must, precisely in the situation with a lack of lubrication, exit from the pore space due to centrifugal forces (during the dynamic operation of the bearing) and thus maintain the tribosystem in the ball bearing. However, the described mechanism has not proven itself in practice, because, on the one hand, the cage becomes very fragile due to the porosity and, on the other hand, the "oil storage effect" does not last long, because the lubricant is very quickly washed out of the pore space by regularly carried out pressure steam sterilization cycles.

Compounds of polyamide and perfluoroalkyl substance(s) and mixtures of these compounds with additional polymer substances are described in DE 198 23 609 A1, whereby modified perfluoroalkyl substance(s) is(are) homogenized with polyamide compound(s) in the molten state by means of a reactive conversion. The use of this material thereby can be as a pure substance or as an additive/ingredient in sliding bearings, in sliding films, in sliding foils, in sliding coatings, in oil-repellent and/or hydrophobics, or component or full body materials that are provided with it, in moldings, in textile threads and/or fleece and/or other textile fabrics, in multi-layer (foil) materials, in membranes, as a coating additive or a coating substance.

Plastic sliding bearings, as mentioned in DE 198 23 609 A1, can be used when a relative motion must be transferred without lubricants (lubricating oil or fat) between the two bearing partners, e.g., the shell and the shaft. The specific surface pressures are not particularly high compared to the plastic sliding bearing after the shaft supports itself with its entire lateral surface in the bearing shell. Even in high performance sliding bearings maximum peripheral speeds of only 1.5 m/s are used. Converted to the size of an example of an, in dental technology used, bearing with a bore diameter of 3.175 mm and an external diameter of 6.35 mm, this results only in a characteristic speed value of about 30,000 mm/min. However, high-performance rolling bearings, such as dental turbine bearings, rotate at a speed of up to 500,000 $min^{-1}$ which corresponds to a characteristic speed value of about 2,400,000 mm/min. This example illustrates that the performance data of a high-performance rolling bearing, such as a dental turbine bearing, are not in any way comparable to those of a high-performance sliding bearing.

SUMMARY OF THE INVENTION

The present invention is therefore based on the task to provide a cage for a rolling bearing, in particular for a ball bearing, made from a high-performance plastic that can be subjected to a sterilization treatment without that the strength of the material deteriorates significantly, and that must have in addition, in spite of the situation with a lack of lubrication, an improved lifespan and a suitability for use in high-speed rolling and ball bearings, preferably in the medical sector, in particular in dental technology.

This task is accomplished by providing the embodiments characterized in the claims.

DESCRIPTION OF THE FIGURE

FIG. 1 is a roller bearing embodiment including a cage.

DESCRIPTION OF THE INVENTION

According to the present invention a cage is provided for a rolling bearing, in particular for a ball bearing, that comprises polyamide imide (PAI) and/or polyimide (PI) and/or polyetherketon (PEK) with chemically coupled fluoropolymer and/or fluorocopolymer and/or fluoro-oligomer, preferably polytetrafluoroethylene (PTFE).

By a PAI and/or PI and/or PEK chemically coupled with fluoro(co)polymer one means a compound material that consists predominantly of a PAI and/or PI and/or a PEK, whereby a fluoro(co)polymer and/or fluoro-oligomer is chemically coupled at least partly to the PAI and/or PI and/or the PEK.

By a chemical coupling is meant, according to the present invention, a combination of at least two polymer/oligomer components by means of the formation of a chemical bond. This coupling of at least two polymer/oligomer components can be complete or at least partial.

By a PAI one means polymers that have in their main chains amide as well as imide functionalities. PAIs are produced by condensation polymerization of aromatic tricarboxylic acid anhydrides such as, e.g., trimellitic anhydride and/or their carboxylic acid derivatives with diisocyanates or diamines. As an example, as PAI those polymers can be used that are commercially available as Torlon® (Solvay company).

By a PI one means polymers whose repetition units are bound by imide groups. Standard, and to an expert familiar, thermoplastic or duroplastic PIs can be used as PI. When using chemically coupled PI-PTFE materials it is familiar to the expert, that the chemical coupling of the PI with the fluoro(co)polymer, and preferably with PTFE, preferably takes place during the polymer synthesis and/or during the postcondensation and/or in a subsequent polymer-analogous reaction in (a) PI thermosets in solution or (b) in thermoplastic PI preferably in the molten state.

PIs are produced by polycondensation of aromatic tetracarboxylic acid anhydrides such as, e.g., pyromellitic dianhydride and/or benzophenone tetracarboxylic dianhydride with diisocyanates or diamines. As a matrix-PI for the coupling with modified PTFE, for example, those polymers can be used that are as Sintimid® (Ensinger company) or as Vespel® (DuPont company) commercially available.

By polyetherketones (PEK) one means polymers that comprise the following structural element:

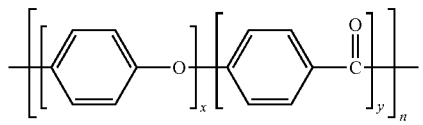

where x=1 and y=1. Polyetherketones, where x=2 and y=1, are referred to as polyetheretherketones (PEEK) and those for whom x=1 and y=2, as polyetherketoneketone (PEKK). Finally, polyetherketones, for which x=2 and y=2, are referred to as polyetheretherketonketone (PEEKK). All these compounds are in the context of the present invention understood as polyetherketone (PEK). As polyetherketone preferably high-melting polymers are used with a melting point>250° C., in particular preferably >300° C. For example, as PEK those polymers can be used that are commercially available as Victrex® 150P or as Victrex® 450P (Victrex company).

By a fluoropolymer one means an organic polymer in which one or more hydrogen atoms of the recurrent units of the polymer chain are replaced by fluorine atoms (partially fluorinated) or in which all hydrogen atoms are replaced by fluorine atoms (perfluorinated) such as, for example, in PTFE or FEP. Instead of fluorine atoms also other halogen atoms, in particular chlorine atoms, can be present as long as this does not deteriorate the desired properties of the fluoropolymer. The fluoropolymer can also have heteroatoms, such as oxygen, in the main chain. Suitable fluoropolymers are for example the fluoropolymers specified in *Römpp-Lexicon Chemie*, 10th edition, Georg Thieme Verlag, 1997, pages 1393 and 1394. Preferably, the fluoropolymer is an organic fluoropolymer that carries a —($CF_2$)— group. As fluoropolymer basically any partially fluorinated or perfluorinated organic polymer can be used that is thermally stable, has good sliding friction properties, and preferably can be modified radiation-chemically, so that reactively functional groups can be introduced that can be converted with the matrix polymer such as a, e.g., PAI and/or PI and/or PEK. The fluoropolymer is polytetrafluoroethylene according to a particularly preferred embodiment of the present invention.

The component of fluoro(co)polymer, preferably polytetrafluoroethylene (PTFE), in the compound is preferably 5 to 60% by mass, in particular preferably 10 to 30% by mass, with respect to the total material of the cage.

It is also possible that other polymers or oligomers, for example, polyolefins, polymers of vinyltype, polycondensation compounds and/or polyaddition compounds, are present in the mixture together with the PAI and/or PI and/or PEK with chemically coupled fluoro(co)polymer.

A compound material formed by chemically coupling of PAI and/or PI and/or PEK to a fluoro(co)polymer can be produced by modification of a fluoro(co)polymer with reactive functional groups and subsequent reactive conversion of the modified fluoro(co)polymer with the matrix polymer such as PAI and/or PI and/or PEK. Preferably, the chemical coupling takes place in a step of the reactive conversion of a modified fluoro(co)polymer with PAI and/or PI and/or PEK. Preferably, this modified fluoro(co)polymer is formed through a radiation-chemical disintegration of a fluoro(co)polymer, preferably PTFE, with a radiation dose greater than 50 kGy, preferably more than 100 kGy, and in particular preferably with a radiation dose of 500 kGy. In addition, it is preferred that this radiation-chemical disintegration is carried out in the presence of a reactant, in particular oxygen.

By a modification of the fluoro(co)polymer described in the above, for example, by the previous radiation-chemical process, functional groups such as carboxylic acid groups and/or carboxylic acid derivatives and/or olefinic groups, such as perfluoroalkylene groups, can be created on the fluoro(co)polymer, whereby a modified fluoro(co)polymer is formed. The modified fluoro(co)polymer with functional groups is capable of coupling completely or at least partially chemically with the matrix polymer such as, e.g., the PAI and/or the PI and/or the PEK. This makes it possible to combine the advantageous properties of both materials into one compound material.

The modified fluoro(co)polymer is chemically coupled to the PAI and/or PI and/or PEK, which results in that the incompatible materials become compatible. The procedure for the coupling of the modified fluoro(co)polymer to PAI and/or PI and/or PEK is in principle not subjected to any significant restriction. For example, the modified fluoro(co) polymer can be coupled by reactive extrusion (melting of the components and/or dispersing the fluoro(co)polymer components in the matrix polymer component at increased temperature) to PAI and/or PI and/or PEK (melt modification reaction). The modified fluoro(co)polymer is at least partly chemically coupled to PAI and/or PI and/or PEK. However, it is also conceivable to modify the fluoro(co) polymer by other, to a professional familiar, procedures by introducing or generating reactive functional groups and chemically coupling during the matrix polymer synthesis (in solution/dispersion or in substance) and/or subsequently in a polymer-analogous reaction (in solution/dispersion) with PAI and/or PI and/or PEK.

In the event that the modified fluoro(co)polymer is chemically coupled by modifying the components in the molten state with PAI and/or PI and/or PEK, it is preferred to mix and at least partially couple the components in a mixer, a one- or two-screw extruder, a multi-shaft mixer, or an injection molding machine (preferably with compounding screw). The reactive conversion of an, in the above described, modified fluoro(co)polymer, which carries the functional groups such as carboxylic acid groups and/or carboxylic acid halide groups and/or olefinic groups such as perfluoroalkylene groups, with a PAI and/or a PI and/or a PEK is carried out in the molten state at a temperature above the melting point of the matrix polymer component, preferably above 200° C., in particular preferably above 300° C. With this melt modification reaction it is possible to at least partly chemically couple the modified fluoro(co)polymer with PAI and/or PI and/or PEK and to obtain thereby a (macroscopic) homogeneous compound material. Such a homogeneous compound material differs substantially from a material that is obtained by mere physical mixing or melting of a (unmodified) fluoropolymer and a PAI and/or PI and/or PEK.

Also additives, fillers, and auxiliary materials can be added in order to adjust the desired properties of the compound material for a rolling bearing cage described herein. These additives, fillers, and auxiliary materials are preferably homogeneously distributed in the compound material for the rolling bearing cage, but can also be applied, for example, only on the surface of it. For example, carbon fibers and/or graphite can be added to the compound material for the rolling bearing cage.

The cage material that is suitable for the cage according to the invention for a rolling bearing, which comprises PAI and/or PI and/or PEK with chemically coupled fluoro(co) polymer, can be produced, for example, as in DE 198 23 609 A1 for the case of the coupling of fluoro(co)polymer with PA, in particular as described in the examples 1 to 8. The coupling of fluoro(co)polymer with PI and/or PEK can take place in a chemical similar way, for example, by an end group reaction such as the coupling with polyamide (PA).

Compared to a sliding bearing, as suggested in DE 198 23 609 A1, the situation is much more complex in a rolling bearing according to the present invention, in particular in a ball bearing such as a dental ball bearing. FIG. 1 is referred to as an illustration of the main differences between a rolling bearing and a sliding bearing. The cage 3 described in FIG. 1 can be used as a ball bearing cage, for example, as a latching cage in grooved ball bearings (as shown in FIG. 1) and as a window-type cage in angular ball bearings/spindle bearings. The cage 3 takes over a certain sliding function because it shores itself either against the outer ring shoulder 7 or the inner ring shoulder 8. The wear generated on these sliding surface is, however, not important for the lifespan of the bearing. If one assumes that the outer ring 1 is fixed in, for example, a dental handpiece and the inner ring 2 rotates with a rotational speed of about 500,000 $min^{-1}$, then the balls 6 rotate with approximately 1,000,000 revolutions per minute around their own axis. The cage is driven by means of the ball and has a rotational speed of approximately 200,000 $min^{-1}$. In the dental turbine the situation is complicated by that a radial load component, which is transferred by the dentist to the drilling tool, tilts the rotor shaft and thus the bearing position. The balls thereby run at a certain angle out of the ideal circular path. This means that the balls inside the ball set assume different rotation speeds and thus transfer alternately pull and pressure loads to the individual bearing pockets of the cage. The extraordinary loads on the cage can be imagined with the knowledge that this process takes place with ball rotational speeds of 1,000,000 revolutions per minute. The bearing pockets wear in the circumferential direction and this can even lead to that the cage is effectively cut off in the middle by the ball complement. This wear mechanism is in no way comparable to that of a plastic sliding bearing. The loads that act on a sliding bearing are significantly lower than the loads acting on a rolling bearing.

Furthermore, according to the present invention a rolling bearing is provided that comprises a cage 3 that includes the PAI and/or PI and/or PEK with chemically coupled fluoro (co)polymer.

In particular, a ball bearing is provided with an inner ring 2 and an outer ring 1 that is coaxially arranged to it, whereby the balls 6 are arranged between the inner ring 2 and the outer ring 1 that are held by means of a cage 3 that comprises PAI and/or PI and/or PEK with chemically coupled fluoro (co)polymer.

The cage 3 according to the invention is above all very suitable for use in high-speed rolling bearings such as ball bearings, in particular for industrial spindle-bearing applications and in the medical sector, in particular in dental technology. As an example of such a rolling bearing a ball bearing can be provided that usually has an inner ring, an outer ring, balls and a cage, whereby the balls move on so-called bearing tracks.

Correspondingly, according to the present invention the use of an, in it described, cage in a rolling bearing is provided, in particular a ball bearing with a characteristic speed value n×dm>1,000,000 mm/min, especially for industrial spindle-bearing applications and in the medical sector, in particular in dental technology.

The (tribological) properties of the compound material are significantly improved by the chemical coupling of a fluoro (co)polymer, preferably of modified polytetrafluoroethylene (PTFE) to the matrix polymer PAI and/or the matrix polymer PI and/or the matrix polymer PEK, so that the lifespan of a rolling bearing, which has a cage made from such a compound material, can be increased significantly.

The specific advantage of the described compound material from a fluoro(co)polymer such as, e.g., polytetrafluoroethylene and PAI and/or PI and/or PEK, lies mainly in the improved dispersion/homogenization of the fluoro(co)polymer in the matrix polymer PAI and/or PI and/or PEK and the stable (processing) morphology. The fluoro(co)polymer and/or fluoro-oligomer component is thereby not only present in the compound materials in a better way, i.e., finely distributed, but the fluoro(co)polymer and/or fluoro-oligomer component is at least partly chemically coupled (via chemical bonds) to PAI and/or PI and/or PEK. This can be determined in a simple way, because, by dissolving the matrix component in a suitable solvent, the fluorine chemical component in the case of a successful coupling can no longer be separated and recovered as a pure fluoro(co)polymer component, or at least no longer completely. A fluoro(co)polymer with chemically coupled matrix polymer is obtained as an insoluble residue, which can be clearly detected analytically.

The chemical coupling of fluoro(co)polymers such as, e.g., polytetrafluoroethylene (PTFE) to PAI and/or PI and/or PEK renders the cage material the property to, even in the case of a lack of lubrication, only wear abrasively slightly unlike the in medical technology distributed and so far widely used cage materials from PI (trade name: Vespel (Dupont company), Meldin (Saint-Gobain company), Sintimid (Ensinger company)), PAI (trade name: Torlon (Solvay Advanced Polymers company)) and PEK (trade name: Tecapeek (Ensinger company) with physical storage/mixing of the additives). The properties can be significantly improved and the lifespan of the cage according to the invention can be considerably increased with respect to hitherto known plastic ball bearing cages because of the chemical coupling of a fluoro(co)polymer, preferably of polytetrafluoroethylenes (PTFE) TF 2025, irradiated with 500 kGy, to PAI, and/or PI and/or PEK.

The lifespan of a rolling bearing cage and ball bearing cage according to the present invention can be extended multiple times in comparison to previously used cages made of high-performance plastics.

The compound material from PAI and/or PI and/or PEK with chemically coupled fluoro(co)polymer can be brought into the appropriate shape by any in the field known procedure for a rolling or a ball bearing cage. This is possible, on the one hand, by creating a semi-finished product (round material or tube) by injection molding or extrusion. The further processing to the finished part (cage) then takes place by means of machining (turning, drilling). After a tempering process the adhering edges are removed by vibratory finishing. Another possibility is the direct production of the finished part (cage) via injection followed by tempering.

FIG. 1 describes a roller bearing, in particular a ball bearing with an inner ring 2 and an outer ring 1 that is arranged coaxially with respect to it, whereby the balls 6 are arranged between the inner ring 2 and the outer ring 1 that are held by a cage 3 according to the present invention.

The invention is explained in more detail by the following example without that the subject matter claimed in the present invention is thereby limited.

EXAMPLE

A cage according to the invention in the form of a latching cage for dental turbine bearings from the compound material consisting of polyamide imide (Torlon® 4000T Solvay Advanced Polymers company) and chemically coupled PTFE (TF 2025 of the Dyneon/3M company, irradiated with electrons with 500 kGy) was prepared as follows and compared to a commercial cage:

The compound material was brought into the shape of round bars by means of injection molding. The machining of latching cages for a dental turbine bearing (hole diameter: 3.175 mm, outer diameter: 6.35 mm, width: 2.779 mm) took place on an I-spindle CNC lathe. The cages according to the invention were obtained after a tempering process (standard procedure of the Solvay company) and a deburring in a vibratory finishing installation.

The cages according to the invention were mounted in turbine bearings and subjected to a lifespan test. A ball bearing served as a reference bearing that is completely identical except for the cage material. The cage material of the reference bearing was an in the dental technology widely distributed lubricated grade polyamide imide with physically mixed-in graphite (12%) and PTFE (3%) (Torlon® type 4301).

The lifespan tests were carried out on an automated dental test stand in which 10 test turbines (dental hand pieces) were driven simultaneously. The handpieces were alternately loaded with a programmed load duty cycle, which acts on the clamped-in drilling tools, and subsequently again unloaded. The failure threshold for the lifespan is the idling speed that is reached in the unloaded state. The handpiece is considered as failing when a certain rotational speed is a no longer reached.

An average lifespan of 27.3 h was achieved with the tested commercial cage from polyamide imide with 12% graphite and 3% PTFE (Torlon® type 4301). The cage according to the invention from polyamide imide (Torlon® 4000T and chemically coupled PTFE (TF 2025, irradiated with electrons with 500 kGy)) attained an average lifespan of 155.5 h.

SYMBOL REFERENCE LIST

1 Outer ring
2 Inner ring
3 Rolling bearing cage (in particular ball bearing cage)
4 Cover disk
5 Snap ring
6 Balls
7 Outer ring-shoulder
8 Inner ring-shoulder

The invention claimed is:

1. A cage for a rolling bearing in dental technology with a characteristic speed value $n \times dm > 1,000,000$ mm/min, consisting of a polyamide imide with chemically coupled fluoropolymer and/or fluorocopolymer.

2. The cage according to claim 1, wherein the fluoropolymer and/or fluorocopolymer is polytetrafluoroethylene.

3. The cage according to claim 1, wherein the proportion of fluoropolymer and/or fluorocopolymer is 5 to 60% by mass.

4. A rolling bearing comprising a cage according to claim 1.

5. The rolling bearing according to claim 4, wherein the rolling bearing is a ball bearing with an inner ring and an outer ring that is arranged coaxially to it, wherein balls are arranged between the inner ring and the outer ring that are held by the cage.

6. The rolling bearing according to claim 5, wherein the cage is a snap-type cage included in grooved ball bearings.

7. The rolling bearing according to claim 5, wherein the cage is a window-type cage included in angular ball bearings or spindle bearings.

* * * * *